(12) United States Patent
Liu et al.

(10) Patent No.: US 7,359,382 B2
(45) Date of Patent: Apr. 15, 2008

(54) METHOD OF DETECTING THE TYPE OF NETWORK ADDRESS TRANSLATOR

(75) Inventors: Chung-Fan Liu, Taipei (TW); Chih-Da Weng, Taipei (TW)

(73) Assignee: Institute For Information Industry, Taipei (TW)

( * ) Notice: Subject to any disclaimer, the term of this patent is extended or adjusted under 35 U.S.C. 154(b) by 773 days.

(21) Appl. No.: 10/847,350

(22) Filed: May 18, 2004

(65) Prior Publication Data

US 2005/0105525 A1    May 19, 2005

(30) Foreign Application Priority Data

Nov. 10, 2003   (TW) .............. 92131409 A

(51) Int. Cl.
   H04L 12/28   (2006.01)
   H04L 12/56   (2006.01)
   H04L 12/66   (2006.01)
   G06F 15/16   (2006.01)
   G06F 15/173  (2006.01)

(52) U.S. Cl. ............ 370/392; 370/401; 370/465; 709/227; 709/230; 709/245

(58) Field of Classification Search ........ 370/392, 370/401, 465; 709/227, 230, 245
See application file for complete search history.

(56) References Cited

U.S. PATENT DOCUMENTS

| | | | |
|---|---|---|---|
| 6,128,298 A * | 10/2000 | Wootton et al. ........... 370/392 |
| 6,493,765 B1 * | 12/2002 | Cunningham et al. ...... 709/245 |
| 6,654,792 B1 * | 11/2003 | Verma et al. ............... 709/208 |
| 6,822,957 B1 * | 11/2004 | Schuster et al. ............ 370/389 |
| 2002/0080752 A1 * | 6/2002 | Johansson et al. .......... 370/338 |
| 2002/0122416 A1 * | 9/2002 | Xu et al. .................... 370/352 |
| 2002/0184316 A1 * | 12/2002 | Thomas et al. ............. 709/206 |
| 2003/0009561 A1 * | 1/2003 | Sollee ........................ 709/227 |
| 2003/0013467 A1 * | 1/2003 | Caloud ....................... 455/466 |
| 2003/0200318 A1 * | 10/2003 | Chen et al. ................. 709/227 |
| 2003/0233471 A1 * | 12/2003 | Mitchell et al. ............ 709/238 |
| 2004/0095937 A1 * | 5/2004 | Piche et al. ................. 370/392 |
| 2004/0139228 A1 * | 7/2004 | Takeda et al. .............. 709/245 |
| 2004/0139230 A1 * | 7/2004 | Kim ........................... 709/245 |
| 2004/0249911 A1 * | 12/2004 | Alkhatib et al. ............ 709/223 |
| 2005/0050211 A1 * | 3/2005 | Kaul et al. .................. 709/229 |

* cited by examiner

Primary Examiner—Alpus H. Hsu
(74) Attorney, Agent, or Firm—Bacon & Thomas, PLLC

(57) ABSTRACT

A method of detecting the type of network address translator utilizes the SIP standard structure and protocol between a user agent and a call manager; wherein after receiving a request message sent from the user agent, the call manager uses different step to reply, and then detects the network type of NAT according to the reply message sent by the user agent.

15 Claims, 2 Drawing Sheets

METHOD OF DETECTING THE TYPE OF NETWORK ADDRESS TRANSLATOR

BACKGROUND OF THE INVENTION

1. Field of the Invention

The present invention relates to a VoIP technique, and more particularly, to a method of detecting the type of network address translator (NAT).

2. Description of the Related Art

With developments in the field of networking technology, the voice over IP (VoIP) technique is gaining importance due to the relatively low costs associated with web-based telephone services. Web-based telephone services have the potential to replace traditional telephone services. On the Internet, connection to a terminal device is provided through a distributed IP address. However, there are a limited number of public IP addresses. Consequently, a network address translation (NAT) technique has been developed to solve this problem. Many computer devices therefore utilize a NAT apparatus to connect to the Internet. In other words, these computer devices individually have a private IP address internally, and the NAT apparatus uses a public IP address to connect externally with the Internet.

Due to requirements imposed by the NAT apparatus for external connectivity, when these computer devices utilize the private IP address to perform communications over a VoIP connection, the connection fails in the networking communications environment. This failure occurs because the computer device cannot establish a real-time protocol connection utilizing the private IP address. A current solution to this problem involves utilizing a STUN technique. As shown in FIG. 1, a practical environment of such a technique includes a STUN client 11, and two STUN servers 12, 13. This technique requires an independent communication protocol; the steps required to perform the technique are quite long (requiring four tests), and only the STUN client 11 can obtain the network type. However, in a practical application, this technique needs to modify or augment another communication protocol to send a detection message to a proper server. Furthermore, this technique requires additional establishment costs for the STUN servers 12,13.

Therefore, it is desirable to provide a method of detecting the type network address translator to mitigate and/or obviate the aforementioned problems.

SUMMARY OF THE INVENTION

A main objective of the present invention is to provide a method of detecting the type of network address translator, which is compatible with a standard SIP structure and which does not require two additional servers or an additional communication protocol.

In order to achieve the above mentioned objective, the method of detecting the type of network address translator is used for a user agent and a call manager, the call manager has a first network address, a second network address, a first connection port, a second connection port, a third connection port and a fourth connection port; the first connection port and the second connection port corresponding to the first network address, the third connection port and the fourth connection port corresponding to the second network address, the method includes: sending a first request message from the user agent to the first connection port of the first network address of the call manager; sending a reply message from the call manager to the user agent to enable the user agent to register at the fourth connection port of the second network address of the call manager, wherein the call manager records as a first address an address of the first request message sent from the user agent; sending a second request message from the user agent to the fourth connection port of the second network address of the call manager; and receiving the second request message by the call manager and recording an address of the second request massage sent from the user agent to obtain a second address, and then comparing the first address and the second address; if the first address and the second address are identical, the call manager sends a first error message to the user agent, and the first error message has a first tag to indicate a first network type.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
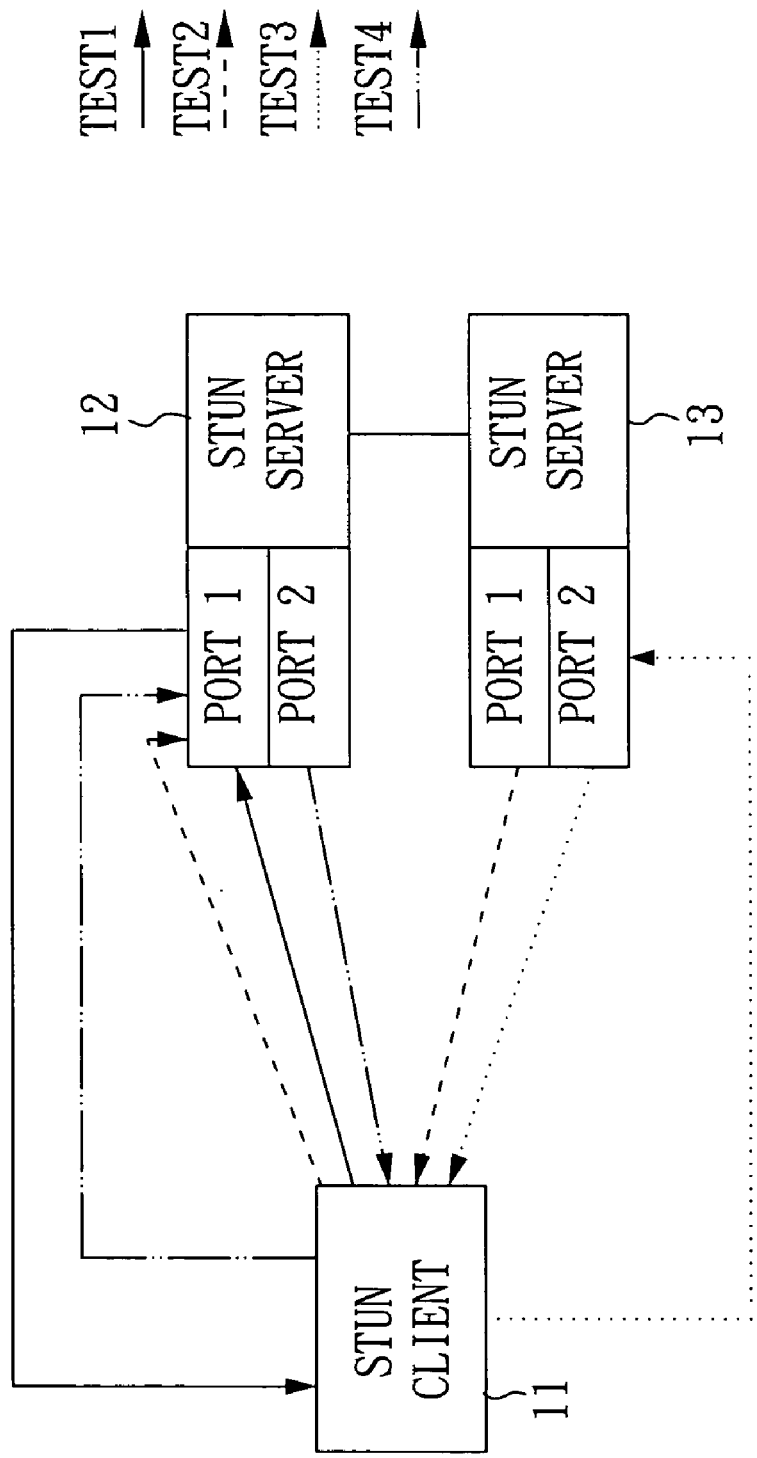
FIG. 1 is a schematic drawing of a prior art STUN technique.
Figure 2:
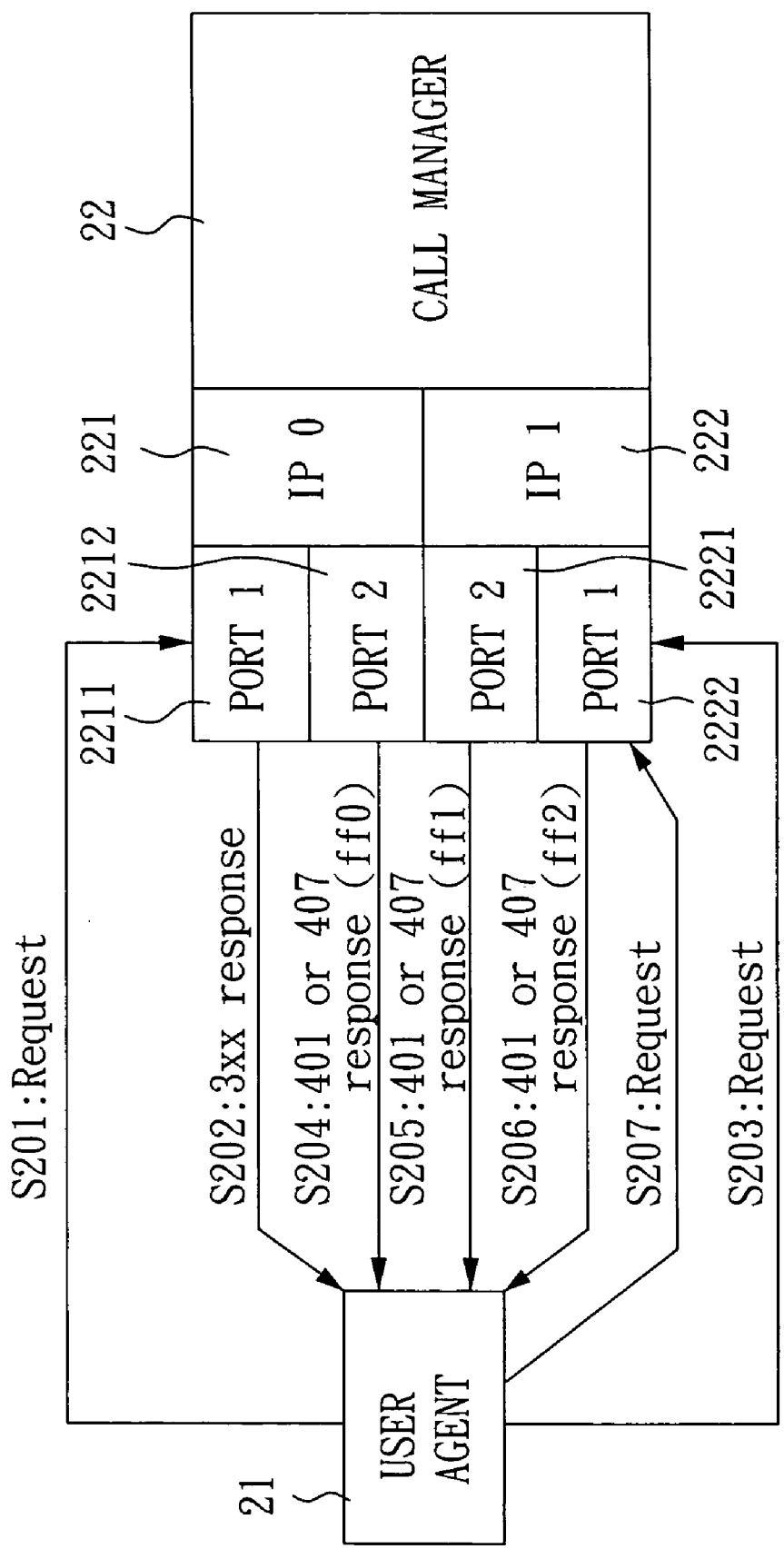
FIG. 2 is a schematic drawing of an embodiment according to the present invention.

The present invention detects the type of network address translator (NAT) in accordance with a standard SIP structure and communication protocol, and an embodiment is performed in a registration stage. Please refer to FIG. 2. FIG. 2 is a schematic drawing of an embodiment according to the present invention. A user agent 21 and a call manager 22 are shown in FIG. 2, wherein the call manager 22 has two network addresses 221, 222. The network address 221 has two related connection ports 2211, 2212, and the network address 222 has two related connection ports 2221, 2222. In this embodiment, the call manager 22 can also be a registrar server or a proxy server.

First, the user agent 21 sends a first request message to the connection port 2211 of the network address 221 of the call manager 22 (step 201). Then, in step 202, the call manager 22 sends a 3xx reply message to the user agent 21 to enable the user agent 21 to send a registration message to the connection port 2222 of the network address 222 of the call manager 22, wherein the 3xx reply message is a standard message in the SIP specification, which provides for sending another request message and changing its sending network address and connection port. Before sending back the 3xx reply message, the call manager 22 records an address of the first request message sent from the user agent 21 as a first address.

The user agent 21 receives the 3xx reply message, and then sends a second request message from the user agent 22 to the connection port 2222 of the network address 222 of the call manager 22 (step 203). After receiving the second request message, the call manager 22 records an address of the second request message sent from the user agent 22 to obtain a second address. Then the user agent 22 compares the first address and the second address. If the first address and the second address are different, the NAT type of the user agent 21 is of a Symmetric NAT type, and step 206 will be executed, which is explained later. If the first address and the second address are identical, the call manager 22 sends a 401 or 407 error message to the user agent 21. The 401 or 407 error messages have characters that are always used in a specific string as a first recognition tag, such as "fff0" (step 204).

Furthermore, if the call manager 22 does not receive a second request message after a predetermined time, it sends a second 401 or 407 error message to the user agent 21 via the connection port 2221 of the network address 222. The second 401 or 407 error message also has characters that are always used in a specific string as a second recognition tag, such as "fff1" (step 205). In this embodiment, the predetermined time is 10 seconds.

If the call manager 22 still does not receive a third request message after 10 seconds, it sends a third 401 or 407 error message with a third tag to the user agent 21 via the connection port 2221 of the network address 222. The third 401 or 407 error message has characters that are always used in a specific string to serve as a third recognition tag, such as "fff2". In step 204, if the first address and the second address are different, the call manager 22 also sends a third 401 or 407 error message with the third tag to the user agent 21 (step 206).

For the user agent 21, after receiving the 401 or 407 error message sent by the call manager 22, it sends a related request message to the call manager 22. In other words, the user agent 21 may send the request message (including one of the above mentioned tags) to the call manager 22 after steps 204, 205 or 206. Then, the call manager 22 determines if this tag was sent from step 204, step 205 or step 206 according to the tag in the request message to obtain the NAT type of the user agent 21. In this embodiment, "fff0" indicates a full cone type, "fff1" indicates a restricted cone type, and "fff2" indicates a port restricted cone type; wherein if "fff2" is sent from step 204, then a symmetric type is indicated.

According to the above-mentioned description, the present invention utilizes the SIP standard structure and protocol, and records a proper message by changing the request message to obtain the network type of the user agent. The present invention is compatible with a standard SIP structure, and does not require two additional servers or an additional communication protocol.

Although the present invention has been explained in relation to its preferred embodiment, it is to be understood that many other possible modifications and variations can be made without departing from the spirit and scope of the invention as hereinafter claimed.

What is claimed is:

1. A method of detecting a type of network address translator (NAT) for a user agent at a call manager, the call manager having a first network address, a second network address, a first connection port, a second connection port, a third connection port and a fourth connection port; the first connection port and the second connection port corresponding to the first network address, the third connection port and the fourth connection port corresponding to the second network address, the method comprising:

sending a first request message from the user agent to the first connection port of the first network address of the call manager;

sending a reply message from the call manager to the user agent to enable the user agent to register at the fourth connection port of the second network address of the call manager, wherein the call manager records as a first address an address of the first request message sent from the user agent;

sending a second request message from the user agent to the fourth connection port of the second network address of the call manager; and receiving the second request message by the call manager and recording an address of the second request massage sent from the user agent to obtain a second address, and then comparing the first address and the second address; if the first address and the second address are identical, the call manager sends a first error message to the user agent, and the first error message has a first tag to indicate a first NAT type.

2. The method as claimed in claim 1, wherein if the call manager does not receive the second request message after a predetermined time, the call manager sends a second error message with a second tag to the user agent, and then the user agent sends a third request message to the call manager; wherein the second tag indicates a second NAT type.

3. The method as claimed in claim 2, wherein if the call manager does not receive the third request message after the predetermined time, the call manager sends a third error message with a third tag to the user agent; wherein the third tag indicates a third NAT type.

4. The method as claimed in claim 3, wherein the first NAT type indicates a port restricted cone type.

5. The method as claimed in claim 3, wherein the third error message is sent from the fourth connection port of the second network address of the call manager.

6. The method as claimed in claim 2, wherein the second NAT type indicates a restricted cone type.

7. The method as claimed in claim 2, wherein the predetermined time is 10 seconds.

8. The method as claimed in claim 2, wherein the second error message is sent from the third connection port of the second network address of the call manager.

9. The method as claimed in claim 1, further comprising: determining the NAT type of the user agent by the call manager according to the tag included in the request message sent by the user agent.

10. The method as claimed in claim 1, wherein the first NAT type indicates a full cone type.

11. The method as claimed in claim 1, wherein if the first address and the second address are different, the call manager sends a third error message with a third tag to the user agent; wherein the third tag indicates a third NAT type.

12. The method as claimed in claim 11, wherein the first NAT type indicates a symmetric type.

13. The method as claimed in claim 1, wherein the first error message is sent from the second connection port of the first network address of the call manager.

14. The method as claimed in claim 1, wherein the reply message is selected from a 300~399 message defined in a Session Initiation Protocol (SIP) specification.

15. The method as claimed in claim 1, wherein the first error message, the second error message and the third error message are selected from 400~499 messages defined in a Session Initiation Protocol (SIP) specification.

* * * * *